Patented Aug. 18, 1942

2,293,591

UNITED STATES PATENT OFFICE 2,293,591

REFINING OF OIL

William B. Chenault, Wellsville, N. Y., assignor to Sinclair Refining Company, New York, N. Y., a corporation of Maine No Drawing. Application August 18, 1939, Serial No. 290,791

3 Claims. (Cl. 196—41)

This invention relates to the refining of oil and, more particularly, to an improved method of treating acid raffinates from solvent extraction processes.

In solvent extraction processes using an acidic solvent or a solvent blend containing an acid, the raffinate obtained from the final stage of the extraction operation is highly acidic. This raffinate, comprising a mixture of oil and solvent, is neutralized in conventional practice by treatment with anhydrous ammonia. The neutralized raffinate containing some free ammonia, and also ammonium sulphate in the case of nitrobenzene-sulphuric acid solvent extraction, is steam distilled in order to remove solvent from the raffinate. The denuded oil is then bleached by subjecting it to contact with an adsorptive earth such, for example, as those known as "Filtrol," "Magnesol," and the like, in order to reduce the optical density color of the oil to a value of about 750 in order to meet commercial specifications.

Neutralization of acid raffinates with ammonia, although satisfactory as far as neutralization of the raffinate is concerned, has several disadvantages. For example, ammonium sulphate produced during neutralization of the acid raffinate of a nitrobenzene-sulphuric acid extraction process decomposes at the elevated temperature required for stripping of solvent from the raffinate, and the acid produced as a result of this decomposition attacks equipment used in the stripping operation. At the same time some of the nitrobenzene is reduced to aniline which, being carried over with the solvent in the stripping operation, forms aniline sulphate when the solvent is again used in the extraction operation. Inasmuch as the formation of aniline represents a loss of nitrobenzene the formation of aniline in the stripping operation must be kept to a minimum and the presence of aniline sulphate is a contaminant which should be avoided as far as is possible.

I have found that substantial economies and advantages are obtainable by neutralizing such acid raffinates with an adsorptive earth, then stripping solvent from the neutralized raffinate, and subsequently improving the color of the oil content of the raffinate by subjecting it to contact with fresh adsorptive earth at an elevated temperature, advantageously at a temperature of about 300° F. The neutralization step may be carried out with advantage at normal temperature. When an acid raffinate is neutralized with adsorptive earth in accordance with my invention and the stripped raffinate, or oil, is subsequently decolorized with fresh adsorptive earth, a substantial net reduction is effected in the amount of earth required for the decolorizing operation and the disadvantages concomitant with neutralization of the raffinate by ammonia are eliminated.

Neutralization of an acid raffinate in accordance with my invention may be effected by subjecting the raffinate to contact with a small proportion, say from about 1 to 10 pounds, of adsorptive earth per barrel (42 gallons) of raffinate. I have found that about 4 pounds of earth per barrel of raffinate gives excellent results although smaller or larger quantities may be used with advantage. Contact time will vary depending upon the acidity of the raffinate, the amount of adsorptive earth used, and the type of contact between earth and raffinate. The necessary period of contact will be readily ascertained by determining the time required to obtain a raffinate having a sufficiently low acid number. Contact between the raffinate and the adsorptive earth may be effected by percolating the raffinate through a bed of the earth, or by agitating the earth with the raffinate for a suitable period of time followed by separation of solid materials by means of a filter press, or the agitation of raffinate with earth may be followed by distillation to remove solvent from the neutralized raffinate and the resulting mixture of denuded oil, earth, and sulphates may then be filtered to separate solid material from the oil. Stripping of solvent from the raffinate may be accomplished as in conventional practice, for example, by vacuum distillation or by steam distillation at atmospheric pressure. The type of stripping operation does not appear to influence the results obtained by the process of my invention.

Neutralization of an acid raffinate with an adsorptive earth in accordance with my invention may be augmented by the use of a small proportion of an extraneous alkaline compound such, for example, as sodium carbonate, lime, and the like. This extraneous alkaline compound may be added directly to a mixture of the raffinate and earth or may be incorporated in the earth before effecting contact between the earth and the raffinate. I have found that 0.5–1.0 pound of sodium carbonate per barrel of acid raffinate may be used with particular advantage.

In order to show the advantages accruing to my novel method of treating acid raffinates, an acid raffinate obtained from the final stage of a nitrobenzene-sulphuric acid solvent extraction process and having an acid number of 4.35 was treated in accordance with conventional practice by neutralizing the raffinate with anhydrous ammonia and by stripping solvent from the neutralized raffinate by distillation with steam at atmospheric pressure and with a vapor temperature of 400° F. at the top of the stripping tower. The bottoms from the stripping tower, comprising the oil content of the raffinate, had an acid number of 0.056 and an optical density color of 2840. This oil required contact with 15% by weight of fresh "Magnesol" for a period of one-half hour at 300° F. in order to reduce its optical density color to 750.

A second portion of the same acid raffinate was then denuded of solvent by atmospheric steam distillation at 400° F. vapor temperature, as in the foregoing test, and the residue, comprising the oil content of the raffinate, had an acid number of 2.57 and an optical density color of 11,500. Treatment of this oil with 15% by weight of fresh "Magnesol" at 300° F. for one-half hour only reduced the optical density color of the oil to 4080.

Another portion of the same acid raffinate was then neutralized in accordance with my invention by treating the oil with 4 pounds of fresh "Magnesol" per barrel of raffinate. After stripping solvent from the neutralized raffinate by atmospheric steam distillation with a vapor temperature of 400° F. at the top of the stripping tower, the bottoms, comprising the oil content of the raffinate, had an acid number of 0.056 and an optical density color of 1740. This oil required contact with only 12.7% fresh "Magnesol" at 300° F. for one-half hour in order to reduce its optical density color to 750. Thus, by neutralizing the acid raffinate with adsorptive earth instead of with ammonia a saving of 2.3% adsorptive earth was effected in the decolorizing operation, this saving representing a decrease of about 7 pounds of earth required to obtain the necessary decoloration of one barrel of oil. Accordingly the use of 4 pounds of earth per barrel of raffinate effected a saving of about 7 pounds of earth per barrel of oil in the decolorizing operation and equivalent to a net saving of about 3 pounds of earth per barrel of oil treated. The optical density color (750) of oil obtained by neutralizing an acid raffinate with adsorptive earth, stripping solvent from the neutralized raffinate, and finally decoloring the oil with fresh earth, in accordance with my novel process, is far superior to the optical density color (4080) of oil obtained from the same acid raffinate when the acid raffinate is first denuded of solvent and subsequently neutralized and decolorized with an amount of adsorptive earth substantially equivalent to the total amount of earth required in my novel process. Furthermore, only 0.62% of the nitrobenzene was converted to aniline during the stripping operation following neutralization with earth whereas 0.66% aniline was formed during the stripping operation when the raffinate was neutralized with ammonia.

It will be seen, therefore, that neutralization of an acid raffinate with an adsorptive earth, either alone or together with an extraneous alkaline compound in the sequence of steps in accordance with my invention effects a reduction in the amount of fresh adsorptive earth required to decolorize the oil. If, on the other hand, the same amount of decolorizing, or adsorptive, earth is used as would be required in conventional decolorizing practice, a substantial improvement is effected in the final color of the oil. The use of an adsorptive earth to neutralize acid raffinates avoids the formation of ammonium sulphate thus eliminating corrosion of the solvent stripping equipment and objectionable contamination of the oil. Furthermore, the elimination of ammonium sulphate from the decolorizing earth makes it possible to reactivate the used earth to a higher efficiency by means of solvents than is possible if ammonium sulphate and aniline sulphate are present in substantial quantities in the earth.

I claim:

1. The method of treating acid raffinates from solvent extraction processes using a solvent blend containing sulphuric acid which comprises neutralizing the acid raffinate substantially entirely by means of an adsorptive earth at normal temperature, stripping solvent from the neutralized raffinate, and subsequently decolorizing the oil content of the raffinate by contact with fresh adsorptive earth at a temperature of about 300° F.

2. The method of treating acid raffinates from solvent extraction processes using a solvent blend containing sulphuric acid which comprises neutralizing the acid raffinate with an adsorptive earth and about 0.5-1.0 pound of extraneous alkaline compound per barrel of acid raffinate at normal temperature, stripping solvent from the neutralized raffinate, and subsequently decolorizing the oil content of the raffinate by contact with fresh adsorptive earth at a temperature of about 300° F.

3. The method of treating acid raffinates from solvent extraction processes using a solvent blend containing sulphuric acid which comprises neutralizing the acid raffinate substantially entirely by means of an adsorptive earth containing a relatively small proportion of an extraneous alkaline compound at normal temperature, stripping solvent from the neutralized raffinate, and subsequently decolorizing the oil content of the raffinate by contact with fresh adsorptive earth at a temperature of about 300° F.

WILLIAM B. CHENAULT.